F. B. MILES.
JOURNALS AND BEARINGS.
No. 185,121. Patented Dec. 5, 1876.
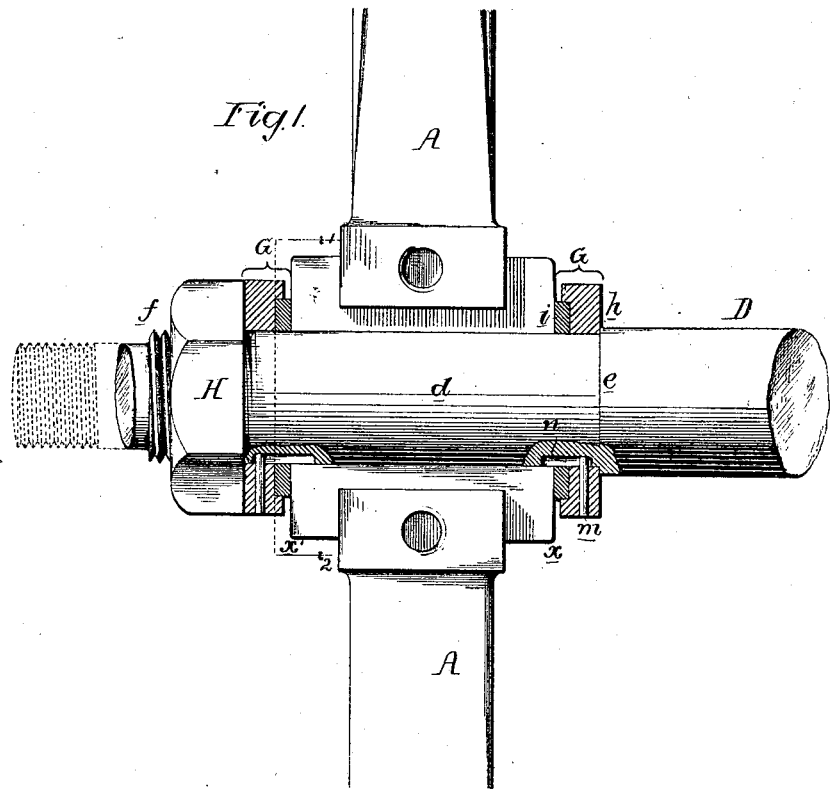
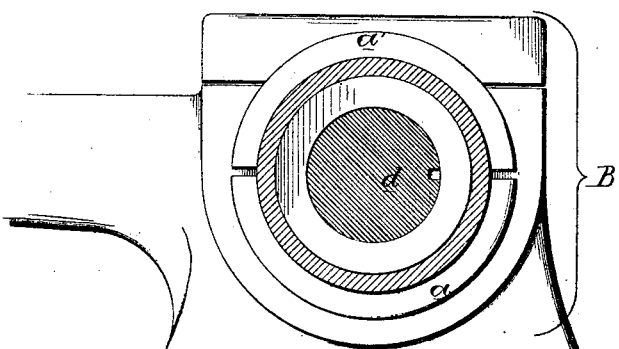

UNITED STATES PATENT OFFICE.

FREDERICK B. MILES, OF PHILADELPHIA, PENNSYLVANIA, ASSIGNOR TO HIMSELF AND OSCAR C. FERRIS, OF SAME PLACE.

IMPROVEMENT IN JOURNALS AND BEARINGS.

Specification forming part of Letters Patent No. 185,121, dated December 5, 1876; application filed August 7, 1876.

*To all whom it may concern:*

Be it known that I, FREDERICK B. MILES, of Philadelphia, Pennsylvania, have invented certain Improvements in Journals and Bearings for Shafts, of which the following is a specification:

The object of my invention is to so combine a washer or washers with the bearing and spindle of the fixed head-stock of a lathe, or with the bearing of any shaft subjected to excessive end thrusts, that effective provisions shall be made for resisting the said thrust, for taking up any end play, and for maintaining the lubricating material within the bearing.

In the accompanying drawing, Figure 1 is a plan view, partly in section, of the rear bearing of the fixed head-stock of a lathe, to which I have, in the present instance, illustrated the application of my invention; and Fig. 2, a vertical section on the line 1 2.

A represents part of the rear end of a fixed head-stock of a lathe, $a$ and $a'$, the usual lower and upper steps forming the bearing B for the journal $d$ of the lathe-spindle D.

The spindle has no projecting collar to interfere with the ready application of pulleys, wheels, &c., but has a shoulder, $e$, between which and the face $x$ of the bearing intervenes a washer, G, a similar washer, G', intervening between the outer end $x'$ of the bearing and a nut, H, adapted to the threaded portion $f$ of the said spindle D. The washers G and G' must turn with the spindle, but must be capable of sliding on the same to a limited extent, so as to permit the taking up of end play, this arrangement being accomplished, in the present instance, by a pin, $m$, driven into the washer, and projecting into a slot, $n$, in the journal; or a pin may project from the lathe into a slot in the washer.

The washers may be made of anti-friction metal or of other appropriate material; but I prefer to make them in the manner shown in the drawing, each washer being made in two parts, $h$ and $i$, the former consisting of a ring of steel or other suitable metal, recessed in its inner face for the reception of part of a ring, $i$, (which I prefer in all cases to make of rawhide,) which should be turned true, so as to fit snugly in the recess of the metal ring $h$, which prevents all warping of the rawhide.

Whether each washer be made of one piece or in two parts, as shown, it will so adapt itself to the end of the bearing and to the spindle as to effectually prevent the escape of oil. At the same time the washers present extended surfaces well calculated to effectually resist the end thrusts on the lathe-spindle without creating undue friction.

In the case of a lathe-spindle the greatest end force is exerted on the washer G; hence it may be made in two parts, as shown and described, while the washer G' may consist of a plain ring. The washer G' may indeed be dispensed with, although I prefer to use it in applying my invention to lathe - spindles. Should there be any end play caused by the wearing of the washer or ends of the bearing, it can be readily taken up by the adjustment of the nut H.

It will be evident that my invention is applicable, generally, to such shafts as are subjected to excessive end strains.

I do not desire to claim, broadly, the interposition of a washer between a collar or nuts on a shaft or spindle and the bearing of the same; nor do I claim, broadly, a washer consisting of a recessed ring combined with and adapted to another ring.

I claim as my invention—

1. The spindle or shaft D, shoulder $e$ on the same, and a washer interposed between the said shoulder and the bearing, and constructed to slide on, but turn with, the spindle, in combination with the bearing B and a nut, H, adapted to the threaded portion of the spindle, all substantially as set forth.

2. The within-described washer, composed of the recessed metal ring $h$ and ring $i$, of rawhide, combined substantially in the manner described.

In testimony whereof I have signed my name to this specification in the presence of two subscribing witnesses.

FREDERICK B. MILES.

Witnesses:
HENRY HOWSON, Jr.,
HARRY SMITH.